(12) United States Patent
Seto et al.

(10) Patent No.: US 6,780,803 B2
(45) Date of Patent: Aug. 24, 2004

(54) ULTRAVIOLET/INFRARED ABSORBENT LOW TRANSMITTANCE GLASS

(75) Inventors: Hiromitsu Seto, Osaka (JP); Yukihito Nagashima, Osaka (JP); Shigekazu Yoshii, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 10/134,465

(22) Filed: Apr. 30, 2002

(65) Prior Publication Data
US 2002/0164487 A1 Nov. 7, 2002

Related U.S. Application Data

(63) Continuation-in-part of application No. 09/630,983, filed on Aug. 1, 2000, now abandoned.

(30) Foreign Application Priority Data
Aug. 26, 1999 (JP) .................................. H11-240097

(51) Int. Cl.[7] .............................................. C03C 3/087
(52) U.S. Cl. ............................ 501/71; 501/55; 501/68; 501/69; 501/70
(58) Field of Search ........................................ 501/71

(56) References Cited

U.S. PATENT DOCUMENTS 5,851,940 A * 12/1998 Boulos et al. ............... 501/71
5,998,316 A * 12/1999 Seto et al. ................... 501/71
6,048,812 A * 4/2000 Brocheton et al. .......... 501/57
6,287,998 B1 * 9/2001 Seto et al. ................... 501/71
6,395,660 B1 * 5/2002 Seto et al. ................... 501/70

FOREIGN PATENT DOCUMENTS

| EP | 0 825 156 | | 2/1998 |
| EP | 0 842 906 | | 5/1998 |
| JP | 10-114540 | * | 5/1998 |
| WO | 96/28394 | | 9/1996 |
| WO | 97/11036 | | 3/1997 |

* cited by examiner

Primary Examiner—Archene Turner
Assistant Examiner—G. Blackwell-Rudasill
(74) Attorney, Agent, or Firm—Manabu Kanesaka

(57) ABSTRACT

The ultraviolet/infrared absorbent low transmittance glass consists of base glass including: 65 to 80 wt. % $SiO_2$; 0 to 5 wt. % $Al_2O_3$; 0 to 10 wt. % MgO; 5 to 15 wt. % CaO (a total amount of MgO and CaO is between 5 to 15 wt. %); 10 to 18 wt. % $Na_2O$; 0 to 5 wt. % $K_2O$ (a total amount of $Na_2O$ and $K_2O$ is between 10 to 20 wt. %); and 0 to 5 wt. % $B_2O_3$; and colorants including: 1.2 to 2.2 wt. % total iron oxide (T-$Fe_2O_3$) expressed as $Fe_2O_3$; greater than 0.03 wt. % CoO; less than 0.0001 wt. % Se; and 0 to 0.2 wt. % NiO. The glass has a visible light transmittance measured by the illuminant A of not greater than 12% in case that the glass has a thickness of 4 mm. The glass has almost neutral color such as bluish green shade or deep green shade, low visible light transmittance, low solar energy transmittance and low ultraviolet transmittance, so that it is useful for windows of vehicles or buildings particularly for thickness and weight reduction of a privacy preventing glass.

9 Claims, No Drawings

ULTRAVIOLET/INFRARED ABSORBENT LOW TRANSMITTANCE GLASS

CROSS REFERENCE TO RELATED APPLICATION

This is a continuation-in-part application of patent application Ser. No. 09/630,383 filed on Aug. 1, 2000 now abandoned.

BACKGROUND OF THE INVENTION AND RELATED ART STATEMENT

The present invention relates to an ultraviolet/infrared absorbent low transmittance glass. More particularly, it relates to an ultraviolet/infrared absorbent low transmittance glass which has an almost neutral color such as bluish green shade or deep green shade, low visible light transmittance, low solar energy transmittance, and low ultraviolet transmittance, so that it is useful for windows of vehicles or buildings particularly for a privacy protecting glass of vehicles and more particularly for reducing the thickness and weight of these windows.

Recently, a variety of glasses with ultraviolet/infrared absorptivity to be used as a vehicle windshield have been proposed with the view of preventing degradation of luxurious interior materials and reducing cooling load of the vehicle. In view of privacy protection, glass with relatively low visible light transmittance is preferably used for a rear window glass of a vehicle. Such kinds of glasses include the followings.

For example, a dark gray colored infrared absorbent glass disclosed in Japanese Patent H7-29813B consists of soda-lime-silica glass including colorants consisting of 1.00 to 1.7 weight percent $Fe_2O_3$ (total iron), at least 0.27 weight percent FeO, 0.002 to 0.005 weight percent Se, and 0.01 to 0.02 weight percent CoO. The glass exhibits luminous transmittance less than 32 percent and total solar infrared transmittance less than 15 percent at 3.9 mm thickness.

A dark gray colored glass disclosed in Japanese Patent H8-157232A consists of soda-lime-silica glass including colorants consisting of 0.8 to 1.4 weight percent $Fe_2O_3$ (total iron), less than 0.21 weight percent FeO, 0.05 to 1.0 weight percent $TiO_2$, 0.02 to 0.05 weight percent CoO, and 0.0005 to 0.015 weight percent Se.

A neutral gray colored glass disclosed in claim 25 of U.S. Pat. No. 5,393,593 includes a base glass consisting of 66 to 75 weight percent $SiO_2$, 10 to 20 weight percent $Na_2O$, 5 to 15 weight percent CaO, 0 to 5 weight percent MgO, 0 to 5 weight percent $Al_2O_3$, and 0 to 5 weight percent $K_2O$, and colorants consisting of 1.00 to 2.2 weight percent $Fe_2O_3$ (total iron), at least 0.20 weight percent FeO, 0.0005 to 0.005 weight percent Se, and 0.010 to 0.030 weight percent CoO. The glass exhibits luminous transmittance less than 35 percent and total solar infrared transmittance less than 20 percent at 3.9 mm thickness.

The glass of neutral color disclosed in the PCT (Japanese phase) H8-506314 consists of soda-lime-silica glass including ferrous iron calculated as follows:

FeO(weight percent)$\geq$0.007+(optical density−0.036)/2.3, also including 0.25 to 1.75 weight percent $Fe_2O_3$ and one or more colorants among Se, $Co_3O_4$, $Nd_2O_3$, NiO, MnO, $V_2O_5$, $CeO_2$, $TiO_2$, CuO and SnO. The glass exhibits visible light transmittance not less than 32%, ultraviolet transmittance not greater than 25%, solar energy transmittance which is less than visible light transmittance by at least 7%, and the dominant wavelength preferably less than 570 nm at 4 mm thickness. Some of these examples can be used for a privacy protecting glass.

In both the dark gray colored infrared absorbent glass disclosed in the Japanese Patent H7-29813B and the deep gray colored glass disclosed in the Japanese Patent H8-157232A, great quantity of Se is used for obtaining a desirable color. Se is toxic and easy to vaporize, so that great quantity of Se is unpreferable for the environment and should be avoided.

The neutral dark gray colored glass disclosed in U.S. Pat. No. 5,393,593 is also unpreferable for the environment because great quantity of Se is contained. Great quantity of FeO is preferable for the heat rays absorptivity, but unpreferable because FeO selectively absorbs the infrared light in a range from 1000 to 1200 nm which is the most efficient range in brightness distribution of flames for producing glass with a usual furnace, and reduces the temperature of the molten glass in the bottom of the furnace which causes various defects.

The foregoing glass which exhibits low visible light transmittance is excellent in privacy protection, but the glass has disadvantages in that it is difficult to see the scenery through the glass. On the other hand, the glass exhibiting a middle transmittance satisfies both privacy protection and safety to some extent. At present, these two kinds of glasses are chosen according to the parts of vehicles or situations.

The aforementioned glass includes selenium in high concentration to provide desired optical properties, without essentially including nickel.

The glass available for privacy protection disclosed in PCT(Japanese Phase) H8-506314 exhibits the neutral color shade by including all kinds of colorants of Ni, Se and Co. However, the glass contains great quantity of Se since Ni content thereof is low.

To solve problems of the prior art mentioned above and to provide the ultraviolet/infrared absorbent low transmittance glass which has a desired almost neutral color such as bluish green shade or deep green shade, low or middle visible light transmittance, low ultraviolet transmittance and low solar energy transmittance with extremely smaller quantity of Se than the prior art or without Se, the applicant proposed the ultraviolet/infrared absorbent low transmittance glass (Japanese Patent H10-114540A) consisting of base glass comprising:

65 to 80 wt. % $SiO_2$;
0 to 5 wt. % $Al_2O_3$;
0 to 10 wt. % MgO;
5 to 15 wt. % CaO wherein a total amount of MgO and CaO is between 5 and 15 wt. %;
10 to 18 wt. % $Na_2O$;
0 to 5 wt. % $K_2O$ wherein a total amount of $Na_2O$ and $K_2O$ is between 10 and 20 wt. %; and
0 to 5 wt. % $B_2O_3$, and a colorant including:

1.2 to 2.2 wt. % total iron oxide (T-$Fe_2O_3$) expressed as $Fe_2O_3$;
0.001 to 0.03 wt. % CoO;
0 to 0.0008 wt. % Se; and
0 to 0.2% NiO.

The ultraviolet/infrared absorbent low transmittance glass disclosed in the Japanese Patent H10-114540A exhibits relatively low visible light transmittance, low solar energy transmittance and low ultraviolet transmittance. This ultraviolet/infrared absorbent low transmittance glass exhibits the visible light transmittance (YA) measured by using standard illuminant "A" in the range about 23 to 50 percent and the solar energy transmittance (TG) in the range about 20 to 35 percent at 4 mm thickness.

Development of low fuel efficiency system, weight reduction of vehicle's body and the like have been in progress in recent years in order to reduce the environmental load generated by vehicles. The weight of the vehicle has been reduced by thinning a steel plate of the body while increasing the strength. Now, still more weight reduction of the vehicle's body has been desired by thinning the window. However, thinning the glass increases the visible light transmittance and solar energy transmittance. An ultraviolet/infrared absorbent low transmittance glass which has sufficiently low visible light transmittance and sufficiently low solar energy transmittance even with a thinner thickness has been desired for reducing thickness and weight of vehicle's windows, but has not been provided yet.

The ultraviolet/infrared absorbent low transmittance glass disclosed in the Japanese Patent H10-114540A exhibits the visible light transmittance in a range from 10 to 25 percent and solar energy transmittance in a range from 10 to 35 percent at 3.1 to 5 mm thickness.

However, it has been desired to develop a still lower transmittance glass which has low visible light transmittance and still lower solar energy transmittance, for example, the visible light transmittance of 10 to 25 percent and solar energy transmittance of 10 to 35 percent at 2.8 mm thickness, in order to reduce the thickness and weight of vehicle's windows.

The glass should have the visible light transmittance in a range from 5 to 15 percent and solar energy transmittance in a range from 5 to 25 percent at its thickness of 4 mm in order to have the visible light transmittance in a range from 10 to 25 percent and solar energy transmittance in a range from 10 to 35 percent at 2.8 mm thickness.

OBJECT AND SUMMARY OF THE INVENTION

It is an object of the present invention to provide an ultraviolet/infrared absorbent low transmittance glass which has almost neutral color such as bluish green shade or deep green shade, low visible light transmittance, low solar energy transmittance and low ultraviolet transmittance so that it is useful for a window of vehicles or buildings particularly for a privacy protecting glass of vehicles more particularly for reducing the thickness and weight of the windows.

The ultraviolet/infrared absorbent low transmittance glass of the present invention consists of a base glass, that is, the major constituents comprising 65 to 80 wt. % $SiO_2$, 0 to 5 wt. % $Al_2O_3$, 0 to 10 wt. % MgO, 5 to 15 wt. % CaO wherein a total amount of MgO and CaO is between 5 and 15 wt. %, 10 to 18 wt. % $Na_2O$, 0 to 5 wt. % $K_2O$ wherein a total amount of $Na_2O$ and $K_2O$ is between 10 and 20 wt. %, and 0 to 5 wt. % $B_2O_3$, and a colorant including, 1.2 to 2.2 wt. % total iron oxide (T-$Fe_2O_3$) expressed as $Fe_2O_3$, more than 0.03 wt. % CoO, less than 0.0001 wt. % Se, and 0.08 to 0.2% NiO, and the glass has the visible light transmittance (YA) measured by using standard illuminant "A" not more than 12 percent at 4 mm thickness.

The ultraviolet/infrared absorbent low transmittance glass of the present invention realizes a low visible light transmittance (YA) not more than 12 percent at 4 mm thickness by increasing CoO more than that included in Japanese Patent H10-114540A while comprising little or no Se.

DESCRIPTION OF THE PREFERRED EMBODIMENTS

The description will be made as regard to an ultraviolet/infrared absorbent low transmittance glass composition. It should be noted that components will be represented with percentage by weight.

$SiO_2$ (silica) is a principal component for forming skeleton of glass. Less than 65% $SiO_2$ lowers the durability of the glass and more than 80% $SiO_2$ raises the melting temperature of the glass so high.

$Al_2O_3$ is a component for improving the durability of the glass. More than 5% $Al_2O_3$ raises the melting temperature of the glass so high. The preferable range of $Al_2O_3$ is between 0.1% and 2%.

MgO and CaO improve the durability of the glass and adjust a devitrification temperature and viscosity of the glass during molding. More than 10% MgO raises the devitrification temperature. Less than 5% or more than 15% CaO raises the devitrification temperature of the glass. The durability of the glass is lowered when the total amount of MgO and CaO is less than 5%, while the devitrification temperature is increased when the total exceeds 15%. MgO is preferably greater than 2% and not greater than 10%. The total amount of MgO and CaO is preferably greater than 7% and not greater than 15%.

$Na_2O$ and $K_2O$ prompt the glass to melt. The efficiency of promotion of melting becomes poor when $Na_2O$ is less than 10% or the total of $Na_2O$ and $K_2O$ is less than 10%, while the durability of the glass is lowered when $Na_2O$ exceeds 18% or the total of $Na_2O$ and $K_2O$ exceeds 20%. $K_2O$ is preferable not to exceed 5% because of its expensive cost.

$B_2O_3$ is a component for improving the durability of the glass, prompting to melt, and yet enhancing the ultraviolet absorption. $B_2O_3$ should be less than 5%, since the glass comprising $B_2O_3$ of more than 5% changes easily its color to yellowish shade due to a decrease in visible blue light transmittance near ultraviolet, and difficulties during molding are caused due to the vaporization of $B_2O_3$ when $B_2O_3$ exceeds 5%.

Iron oxide is present in the form of $Fe_2O_3$ and the form of FeO in the glass. $Fe_2O_3$ is a component for improving the ultraviolet absorptivity and FeO is a component for improving the heat rays absorptivity.

When the total amount of iron oxide (T-$Fe_2O_3$) expressed as $Fe_2O_3$ is not greater than 1.2%, desired optical properties can not be obtained because of low efficiency of ultraviolet and infrared absorptivity. On the other hand, when T-$Fe_2O_3$ exceeds 2.2%, temperature in the top of the furnace might exceed the heat resistant temperature of the furnace during melting the glass due to radiant heat which is generated by the effect of heat rays absorption of iron oxide. When T-$Fe_2O_3$ exceeds 2.2 wt. %, it takes long time to change composition of the molten glass in case that the glass is produced continuously in the furnace. The desirable content of T-$Fe_2O_3$ is in a range from 1.2 to 1.5% preferably in a range from 1.2 to 1.4%.

When T-$Fe_2O_3$ is in a range from 1.2 to 1.5%, there is a merit that it takes relatively short time to change composition of the molten glass in case that the glass is produced continuously in the furnace because the load on the furnace during melting is low due to low T-$Fe_2O_3$ content. Particularly, when T-$Fe_2O_3$ is in a range from 1.2 to 1.4%, above merit is great and sufficient ultraviolet absorptivity can be obtained with only iron.

$Fe_2O_3$ has a function of particularly increasing the absorptivity in ultraviolet range when glass is reinforced by air blast cooling. When T-$Fe_2O_3$ is in the range mentioned above, the desired color shade of the glass can be obtained after discoloration due to the reinforcement process by air blast cooling.

A desirable FeO/T-$Fe_2O_3$ ratio (a weight percentage of FeO expressed as $Fe_2O_3$ against T-$Fe_2O_3$) is in a range from 15 to 50%. When this ratio is less than 15%, sufficient heat rays absorptivity is not obtained due to low FeO content.

When the FeO/T-$Fe_2O_3$ ratio is more than 50%, the glass reduces its visible light transmittance, and changes its color to bluish shade, and nickel sulfide stones are sometimes present in the molten glass due to large quantity of $Fe^{2+}$ which is relatively reductive. More than 35% of FeO/$Fe_2O_3$ ratio sometimes causes silica scum and growth of streaks with rich silica. When the FeO/$Fe_2O_3$ ratio is in a range from 25 to 35%, the glass has high ultraviolet absorptivity, high heat rays absorptivity, and almost neutral and green shade. In this case, values expressed as $Fe_2O_3$ are used for the content of FeO.

CoO is a component for forming an almost neutral color such as greenish gray shade by cooperating with Se and/or NiO, and $Fe_2O_3$ for controlling the visible light transmittance. Not greater than 0.03% CoO can not form a desired color shade and makes the visible light transmittance too high. More than 0.05% CoO makes the color too blue tint and reduces the visible light transmittance. The content of CoO is preferable to be in a range exceeding 0.03% and less than 0.05%.

Se contributes a pink color, so that it reduces the excitation purity with the aid of a complementary color of CoO. As NiO is included, Se may not be always included. More than 0.0001% Se reduces the visible light transmittance. The glass of the present invention may have the desired color shade without comprising Se.

NiO is a component for controlling the visible light transmittance and for reducing the excitation purity as like as CoO. When NiO is more than 0.2%, nickel sulfide stones are sometimes present in the product and the visible light transmittance is reduced. In addition, the obtained shade becomes too greenish. The content of NiO is preferable in a range from 0.08 to 0.2%, and more preferably in a range from 0.1% to 0.2% for low visible light transmittance.

When the concentration of NiO in the glass is too high, there is a possibility that NiO coagulates to form a nickel sulfide stones. However, when NiO is in the range defined by this invention, the desired color shade can be obtained without producing the nickel sulfide stones.

It is known that the coordination number of NiO varies according to the rate of cooling glass so that the color of the glass varies. This is because the cooling varies the coordination number of oxide around $Ni^{2+}$ from 6 into 4 and thus varies the optical absorption. The absorption of $Ni^{2+}$ with octahedral coordination exists around 430 nanometers so as to contribute yellow to the glass, while the absorption of $Ni^{2+}$ with tetrahedral coordination exists from 500 to 640 nanometers. Therefore, the excitation purity would be reduced to obtain the preferable shade by using $Ni^{2+}$ with tetrahedral coordination. Equal to or greater than 0.08% NiO reduces the excitation puratiy of the glass sufficiently, and gives the glass almost neutral grayish green shade. Equal to or greater than 0.1% NiO reduces a transmittance of far infrared rays in a wave length range of 1800–2000 nm of the glass, whereby the transmitted rays of the glass does not give the scorching heat to a human body. Windshields of passenger cars are normally reinforced by air blast cooling for safety. The reinforcement process by air blast cooling also varies the coloring condition of NiO. In the present invention, the desired color shade can be obtained without adding Se by the discoloration due to the reinforcement process by air blast cooling.

One or more than two among $V_2O_5$, $MoO_3$, CuO, $Cr_2O_3$, and the like may be added as colorant and $SnO_2$ within a rang from 0% to 1% in total may be added as a reducing agent and clarifying agent in such a range as not to lose middle transmittance and the almost neutral grayish green shade. To further securely prevent the formation of nickel sulfide stones, ZnO may be added in a range from 0% to 1%.

In the present invention, the glass is preferable to be reinforced by the air blasting. The desired color shade and optical properties are obtained in the reinforced process when the glass has the composition of the present invention comprising CoO and $Fe_2O_3$ in the specific amount.

In the reinforcement process, the glass plate produced from the molten glass is reheated at 600 to 750° C. for 2 to 5 minutes, and then, cooled by blasting air of 10 to 30° C. at a cooling rate of 100 to 300° C./sec.

This reinforcement process by air blasting makes the glass bluish green or deep green shade due to CoO, NiO and $Fe_2O_3$ in the glass, and reduces the visible light transmittance and ultraviolet transmittance while keeping the high heat rays absorptivity.

The ultraviolet/infrared absorbent low transmittance glass of the present invention has a visible light transmittance (YA) measured by using C.I.E standard illuminant "A" of not greater than 12% preferably in a range from 4 to 10%, a solar energy transmittance (TG) preferably not greater than 20% more preferably in a range from 6 to 15%, and an ultraviolet transmittance (TUV) defined by ISO preferably not greater than 10% more preferably not greater than 8% at 4 mm thickness.

In case of using L* a* b* color system, the chromaticity, expressed as a* and b*, of the glass color is preferably in ranges of $-15 \leq a^* \leq -5$ and $-10 \leq b^* \leq 10$, respectively.

When the glass is used for a privacy protecting glass in a rear window of a vehicle, the chromaticity expressed as a* and b* is preferably in a range of $|a^*|-|b^*| \leq 5$ (that is, the remainder of the absolute values of a* and b* is not greater than 5) because almost neutral color shade is particularly preferred.

When measured by using C.I.E. standard illuminant "C" over the wavelength range from 380 to 770 nanometers, the glass of the present invention preferably has optical properties with a dominant wavelength (λd) in the range from 480 to 580 nanometers more preferably 480 to 525 nm, and an excitation purity (Pe) of not greater than 20% more preferably not greater than 15% in case the glass has a thickness of 4 mm.

Hereinafter, the present invention will be described referring to examples.

EXAMPLES 1 THROUGH 11, COMPARATIVE EXAMPLES 1 THROUGH 3

Glass raw material is prepared by adding required composition consisting of ferric oxide, cobalt oxide, and nickel oxide, and titanic oxide and cerium oxide if needed to a standard soda-lime-silica glass batch composition, also adding carbonaceous reducing agent (concretely, coke powder etc.) at a ratio of about 0.01 parts by weight per 100 parts of the glass raw material therein, and mixing them. The glass raw material thus prepared is heated and melted in an electric furnace at 1500° C. for 4 hours. The molten glass is flowed onto a stainless plate and annealed to the room temperature for 16 hours to obtain a 6 mm thick glass plate. After polishing the glass plate in such a manner that the thickness reduces to 4 mm, the glass plate is reinforced with reheating it at 700° C. for 5 minutes and then cooling it with 20° C. air blast at a wind pressure of 3.2 to 2.1 kgf/mm², wind flow of 0.7 to 0.6 Nm³/min., and cooling rate of 200° C./s to become a sample. Each sample is measured in the visible light transmittance by the C.I.E. illuminant A (YA), the solar energy transmittance (TG), the ultraviolet transmittance by ISO 9050(Tuv), the dominant wavelength by the illuminant C($\lambda$d), the excitation purity (Pe), and the transmittance of 1900 nm far infrared ray at 4 mm thickness. L*, a* and b* are also measured following C.I.E.L.A.B.

TABLE 1

| Base glass composition (wt. %) | | |
|---|---|---|
| | $SiO_2$ | 71 |
| | $Al_2O_3$ | 1.6 |
| | MgO | 3.6 |
| | CaO | 7.7 |
| | $Na_2O$ | 13.7 |
| | $K_2O$ | 0.9 |

TABLE 2

| | 1 | | 2 | | 3 | | 4 | | 5 | |
|---|---|---|---|---|---|---|---|---|---|---|
| T-Fe2O3 | 1.3 | | 1.4 | | 1.5 | | 1.3 | | 1.2 | |
| FeO | 0.29 | | 0.34 | | 0.34 | | 0.29 | | 0.29 | |
| NiO | 0.15 | | 0.14 | | 0.13 | | 0.16 | | 0.16 | |
| CoO | 0.031 | | 0.031 | | 0.031 | | 0.033 | | 0.034 | |
| Se | 0 | | 0 | | 0 | | 0 | | 0 | |
| TiO2 | 0.03 | | 0.03 | | 0.06 | | 0.00 | | 0.00 | |
| CeO2 | 0.00 | | 0.00 | | 0.00 | | 0.00 | | 0.00 | |
| FeO/T-Fe2O3 | 24.8 | | 27.0 | | 25.0 | | 24.9 | | 26.7 | |
| Before or after blast cooling | Before | After | Before | After | Before | After | Before | After | Before | After |
| YA | 9.5 | 7.6 | 9.6 | 7.8 | 10.0 | 8.2 | 8.6 | 6.8 | 8.5 | 6.7 |
| TG | 11.3 | 10.2 | 9.9 | 9.5 | 10.2 | 10.1 | 10.8 | 10.3 | 11.0 | 11.0 |
| Tuv | 7.8 | 5.8 | 6.5 | 5.5 | 5.3 | 4.6 | 7.7 | 7.0 | 9.3 | 8.6 |
| $\lambda$ d | 501.8 | 489.2 | 498.1 | 495.4 | 497.0 | 490.2 | 500.0 | 489.4 | 496.5 | 488.6 |
| Pe | 6.2 | 8.9 | 8.2 | 11.1 | 8.9 | 11.9 | 6.6 | 9.8 | 7.8 | 11.3 |
| L* | 37.6 | 32.2 | 37.9 | 35.4 | 38.7 | 36.2 | 35.9 | 30.1 | 35.7 | 32.9 |
| a* | −8.6 | −5.0 | −9.5 | −7.0 | −9.9 | −7.4 | −8.2 | −5.3 | −7.9 | −5.0 |
| b* | 1.4 | −2.4 | 0.6 | −2.5 | 0.2 | −2.8 | 0.9 | −2.4 | 0.0 | −3.4 |
| % T1900 | 18.8 | 16.3 | 15.8 | 14.1 | 16.2 | 14.5 | 17.5 | 15.7 | 17.3 | 15.6 |

TABLE 3

| | 6 | | 7 | | 8 | | 9 | | 10 | | 11 | |
|---|---|---|---|---|---|---|---|---|---|---|---|---|
| T-Fe2O3 | 1.9 | | 1.9 | | 2.2 | | 2.2 | | 1.7 | | 1.9 | |
| FeO | 0.41 | | 0.43 | | 0.53 | | 0.53 | | 0.41 | | 0.50 | |
| NiO | 0.10 | | 0.10 | | 0.11 | | 0.16 | | 0.10 | | 0.10 | |
| CoO | 0.032 | | 0.031 | | 0.031 | | 0.033 | | 0.031 | | 0.031 | |
| Se | 0 | | 0 | | 0 | | 0 | | 0 | | 0 | |
| TiO2 | 0.60 | | 0.50 | | 0.00 | | 0.00 | | 0.70 | | 1.10 | |
| CeO2 | 0.00 | | 0.00 | | 0.00 | | 0.30 | | 0.00 | | 0.00 | |
| FeO/T-Fe2O3 | 24.1 | | 25.2 | | 26.7 | | 26.7 | | 26.7 | | 29.2 | |
| Before or after blast cooling | Before | After | Before | After | Before | After | Before | After | Before | After | Before | After |
| YA | 9.2 | 7.5 | 9.2 | 7.5 | 8.1 | 6.5 | 8.8 | 7.1 | 9.7 | 8.0 | 8.5 | 6.6 |
| TG | 7.8 | 7.0 | 7.4 | 6.8 | 5.8 | 5.2 | 6.1 | 5.3 | 8.1 | 7.4 | 6.0 | 5.1 |
| Tuv | 0.8 | 0.0 | 0.9 | 0.1 | 0.9 | 0.1 | 0.2 | 0.0 | 1.2 | 0.4 | 0.1 | 0.0 |
| $\lambda$ d | 496.8 | 489.9 | 497.0 | 490.3 | 496.5 | 490.0 | 496.5 | 490.6 | 496.6 | 490.0 | 501.7 | 494.8 |
| Pe | 9.6 | 11.9 | 9.8 | 11.9 | 11.3 | 14.0 | 11.7 | 14.5 | 9.5 | 11.6 | 8.3 | 8.7 |
| L* | 37.3 | 33.7 | 37.3 | 33.9 | 35.4 | 31.6 | 36.7 | 33.0 | 38.3 | 34.8 | 35.9 | 31.5 |
| a* | −10.3 | −7.0 | −10.6 | −7.2 | −11.4 | −7.9 | −12.2 | −9.0 | −10.2 | −7.0 | −11.0 | −7.3 |
| b* | 0.1 | −2.8 | 0.2 | −2.7 | 0.0 | −3.1 | 0.0 | −3.0 | 0.0 | −2.8 | 1.7 | −0.5 |
| % T1900 | 13.6 | 12.4 | 12.5 | 11.7 | 8.9 | 8.0 | 8.1 | 6.8 | 13.8 | 12.5 | 10.3 | 9.1 |

Table 1 shows the base glass composition thus obtained. Tables 2–4 show T-$Fe_2O_3$ concentration, FeO (expressed as $Fe_2O_3$)/T-$Fe_2O_3$ ratio(wt. %), CoO concentration, NiO concentration, $TiO_2$ concentration and $CeO_2$ concentration of the respective samples, and show the optical properties of the respective samples measured before and after the reinforcement process by air blast cooling.

In Table 1, the figures after the decimal point of $SiO_2$ wt. % is not expressed, because $SiO_2$ weight percent is rounded to the nearest whole number.

TABLE 4

| | 1 | 2 | 3 |
|---|---|---|---|
| t-Fe2O3 | 1.3 | 1.1 | 1.5 |
| FeO | 0.29 | 0.32 | 0.34 |
| NiO | 0.10 | 0.04 | 0.07 |
| CoO | 0.028 | 0.038 | 0.031 |
| Se | 0 | 0 | 0 |
| TiO2 | 0.00 | 0.80 | 0.06 |

TABLE 4-continued

| | | | | | | |
|---|---|---|---|---|---|---|
| CeO2 | 0.00 | | 0.00 | | 0.00 | |
| FeO/T-Fe2O3 | 24.7 | | 32.1 | | 25.0 | |
| Before or after blast cooling | Before | After | Before | After | Before | After |
| YA | 13.2 | 12.3 | 13.9 | 12.6 | 14.2 | 12.5 |
| TG | 14.1 | 13.8 | 14.4 | 14.0 | 13.2 | 12.4 |
| Tuv | 8.0 | 8.3 | 6.2 | 5.2 | 5.7 | 4.9 |
| λ d | 491.0 | 498.5 | 481.0 | 479.3 | 485.8 | 483.2 |
| Pe | 11.0 | 14.3 | 33.0 | 36.0 | 19.9 | 22.6 |
| L* | 44.0 | 42.7 | 46.3 | 44.3 | 46.0 | 43.4 |
| a* | −8.5 | −7.8 | −6.5 | −3.8 | −9.2 | −6.6 |
| b* | −2.7 | −5.7 | −19.4 | −22.0 | −8.8 | −11.2 |
| % T1900 | 22.4 | 20.0 | 20.6 | 18.9 | 19.5 | 18.3 |

As shown from above Tabels, the present invention provides the glass which has the visible light transmittance (YA) measured by using the illuminant "A" of not greater than 12%, a solar energy transmittance (TG) of not greater than 20% and an ultraviolet transmittance (TUV) defined by ISO 9050 of not greater than 10% at 4 mm thickness.

On the other hand, the glasses of the comparative examples 1 and 3 including CoO of 0.03 wt. % or less have the visible light transmittance (YA) greater than the present invention.

Comparative example 2 includes only 1.1 weight percent T-Fe$_2$O$_3$, so that a visible light transmittance (YA) is high.

As mentioned above, the present invention provides the ultraviolet/infrared absorbent low transmittance glass which has low visible light transmittance, low solar energy transmittance, and low ultraviolet transmittance, and particularly very low visible light transmittance and almost neutral color such as bluish green shade or deep green shade.

When the ultraviolet/infrared absorbent low transmittance glass of the present invention is used for rear windows of vehicles or buildings, the glass shows good effects of preventing degradation, preventing discoloring of interior materials, and protecting privacy. Particularly, the ultraviolet/infrared absorbent low transmittance glass of the present invention exhibits sufficiently low visible light transmittance, low solar energy transmittance and low ultraviolet transmittance with a thin plate, so that weight of a vehicle can be reduced by thin window glasses.

What is claimed is:

1. An ultraviolet/infrared absorbent low transmittance glass consisting of base glass and colorants, said base glass comprising:

65 to 80 wt. % SiO$_2$;

0 to 5 wt. % Al$_2$O$_3$;

0 to 10 wt. % MgO;

5 to 15 wt. % CaO wherein a total amount of MgO and CaO is between 5 and 15 wt. %;

10 to 18 wt. % Na$_2$O;

0 to 5 wt. % K$_2$O wherein a total amount of Na$_2$O and K$_2$O is 10 to 20 wt. %; and 0 to 5 wt. % B$_2$O$_3$;

and said colorants comprising:

1.2 to 2.2 wt. % total iron oxide (T-Fe$_2$O$_3$) expressed as Fe$_2$O$_3$;

greater than 0.031 and not greater than 0.05 wt. % CoO;

less than 0.0001 wt. % Se; and 0.11 to 0.2 wt. % NiO;

and having a visible light transmittance (YA) measured by using the illuminant "A" of not greater than 12% at 4 mm thickness, an excitation purity of not greater than 15% by the illuminant C in case that the glass has a thickness of 4 mm, a dominant wavelength between 480 and 525 nm by the illuminant C in case that the glass has a thickness of 4 mm, and bluish green shade or deep green shade.

2. An ultraviolet/infrared absorbent low transmittance glass as claimed in claim 1, wherein MgO is greater than 2 and not greater than 10 wt. % wherein a total amount of MgO and CaO is greater than 7 and not greater than 15 wt. %.

3. An ultraviolet/infrared absorbent low transmittance glass as claimed in claim 1, wherein Se is not substantially contained.

4. An ultraviolet/infrared absorbent low transmittance glass as claimed in claim 1, wherein FeO expressed as Fe$_2$O$_3$ is between 15 and 50 wt. % of T-Fe$_2$O$_3$.

5. An ultraviolet/infrared absorbent low transmittance glass as claimed in claim 1, wherein the glass has a total solar light transmittance (TG) measured by using the illuminant "A" of not greater than 20% and ultraviolet transmittance (TUV) specified by ISO of not greater than 10% in case that the glass has a thickness of 4 mm.

6. An ultraviolet/infrared absorbent low transmittance glass as claimed in claim 1, wherein the glass has YA of 4 to 10%, TG of 6 to 15% and TUV of not greater than 8%.

7. An ultraviolet/infrared absorbent low transmittance glass as claimed in claim 1, wherein the glass has color coordinates of $-15 \leq a^* \leq -5$ and $-10 \leq b^* \leq 10$ defined by the C.I.E.L.A.B.

8. An ultraviolet/infrared absorbent low transmittance glass as claimed in claim 1, wherein the glass is reinforced by air blast cooling.

9. An ultraviolet/infrared absorbent low transmittance glass as claimed in claim 1, wherein said colorants consist essentially of 1.2 to 2.2 wt. % total iron oxide (T-Fe$_2$O$_3$) expressed as Fe$_2$O$_3$; greater than 0.031 and not greater than 0.05 wt. % CoO; less than 0.0001 wt. % Se; and 0.11 to 0.2 wt. % NiO.

* * * * *